United States Patent [19]

Tse Tang

[11] Patent Number: 5,702,503
[45] Date of Patent: Dec. 30, 1997

[54] COMPOSITE GAS SEPARATION MEMBRANES AND MAKING THEREOF

[75] Inventor: Man-Wing Tse Tang, Alhambra, Calif.

[73] Assignee: UOP, Des Plaines, Ill.

[21] Appl. No.: 557,119

[22] PCT Filed: Jun. 3, 1994

[86] PCT No.: PCT/US94/06339

§ 371 Date: Dec. 12, 1995

§ 102(e) Date: Dec. 12, 1995

[87] PCT Pub. No.: WO94/29002

PCT Pub. Date: Dec. 22, 1994

[51] Int. Cl.[6] .................. B01D 53/22; B01D 69/12; B01D 71/64
[52] U.S. Cl. .................. 95/45; 95/51; 95/54; 96/13; 55/524; 427/434.3; 427/439.5; 428/318.8; 428/473.5
[58] Field of Search .................. 55/524; 95/45, 95/51, 54; 96/11–13; 210/500.39; 427/434.2, 434.3, 434.5; 428/318.8, 319.3, 319.9, 473.5

[56] References Cited

U.S. PATENT DOCUMENTS

| | | | |
|---|---|---|---|
| 3,767,737 | 10/1973 | Lundstrom | 96/13 X |
| 3,980,456 | 9/1976 | Browall | 96/13 |
| 4,230,463 | 10/1980 | Henis et al. | 96/12 X |
| 4,406,673 | 9/1983 | Yamada et al. | 96/12 X |
| 4,602,922 | 7/1986 | Cabasso et al. | 96/13 |
| 4,832,713 | 5/1989 | Yamada et al. | 96/13 |
| 4,880,441 | 11/1989 | Kesting et al. | 96/13 X |
| 4,990,165 | 2/1991 | Bikson et al. | 96/13 |
| 5,007,944 | 4/1991 | Pinnay et al. | 96/10 X |
| 5,049,167 | 9/1991 | Castro et al. | 96/13 X |
| 5,160,353 | 11/1992 | Gochanour | 96/10 |
| 5,165,963 | 11/1992 | Matsumoto et al. | 96/13 X |
| 5,176,724 | 1/1993 | Saito et al. | 96/13 |
| 5,178,940 | 1/1993 | Matsumoto et al. | 96/13 |
| 5,286,280 | 2/1994 | Chiou | 96/13 X |
| 5,342,432 | 8/1994 | Haubs et al. | 96/13 X |
| 5,356,459 | 10/1994 | Bikson et al. | 96/10 X |

*Primary Examiner*—Robert Spitzer
*Attorney, Agent, or Firm*—Thomas K. McBride; Eugene I. Snyder

[57] ABSTRACT

A composite membrane made of an asymmetric porous support and an ultrathin layer having a thickness of less than 100 nm is provided. A method of making the membrane and method for carrying out gas separations using the membrane are also provided.

37 Claims, 1 Drawing Sheet

FIGURE 1

COMPOSITE GAS SEPARATION MEMBRANES AND MAKING THEREOF

FIELD OF THE INVENTION

This invention relates to the field of composite gas separation membranes. More particularly, this invention relates to composite gas separation membranes comprising an asymmetric porous support and an ultrathin membrane forming polymer film.

BACKGROUND

Much technology has already been developed concerning composite gas separation membranes. Fundamentally, the purpose for a composite (or "multiple-layer") membrane structure is to allow the selection and combination of multiple materials which can each perform some of the necessary functions of the overall membrane better than any one of the materials could perform all of such functions. The process of selective passage of certain types of molecules in gaseous phase through a nonporous membrane material is a complex phenomenon occurring on a molecular level. Generally, the molecular selectivity is a combination of diffusion through the membrane material and gas solubility within the membrane material. Referring to the diffusion concept, the selective membrane material must have the very special performance property that certain types of molecules preferentially will pass through it, resulting in a concentration of such types of molecules on the permeate side of the membrane. Such selective membrane materials can be very expensive to develop and produce, and accordingly they command a high price. Further, since the gas molecules must physically pass through the selective membrane itself, overall membrane flux will be maximized when the selective membrane thickness is minimized. This is a crucial consideration in designing a gas separation membrane, because higher flux translates into higher productivity. Lower flux directly results in greater compression requirements to force the gas through the membrane, translating into increased operating costs. As a result of these considerations, the gas molecule selection function of a gas separation membrane is best performed by an ultrathin layer of a specially-selected, often expensive selective membrane material.

One class of such membrane forming polymers are those referred to as the "6FDA or 6FDA-type polyimides". These polymers can be formed by (A) the condensation of 5,5'-2,2,2-trifluoro-1-(trifluoromethyl)ethylidene-bis-1,3-isobenzo-furanedione (known as "6FDA") with an aromatic diamine such as 1,5-diaminonaphthalene or 1,3-diaminobenzene; and (B) dehydration to yield a 6FDA polyimide. The value and applicability of 6FDA polyimides as gas separation membranes is well known and documented, e.g., in the Hoehn et al U.S. Pat. Reissue No. 30,351 (based on U.S. Pat. No. 3,899,309), the Hayes U.S. Pat. No. 4,717,394, and the Ekiner et al U.S. Pat. No. 5,085,676. Other known membrane forming polymers include cellulose triacetate (CTA), polyethersulfone (PES), polytrimethylsilylpropyne (PTMSP), polyetherimide (PEI) and polypropylene oxide (PPO).

A process for laminating a polymer layer to a paper support is disclosed in the Lundstrom U.S. Pat. No. 3,767,737. In this process a polymer solution is spread out on the surface of a pool of water. When the solvent of the polymer solution evaporates the polymer solidifies and forms an ultrathin film on the water surface. This thin polymer film is then picked up by and laminated to a paper web.

Another important function of a gas separation membrane is to withstand the pressure drop across the membrane which is encountered in and necessary for its operation, and otherwise endure a reasonable lifetime as an integral material in the intended operating environment. This function is best performed by a structural support material which (1) can be prepared economically as a relatively thick layer which will provide adequate mechanical strength, and (2) is highly. permeable, so as not to markedly reduce the gas flux of the overall membrane.

It was an object of the invention to provide a composite membrane which would combine the features of (1) withstanding extensive pressure drops, (2) being highly permeable and (3) having an ultrathin membrane layer, which ultrathin membrane layer would not collapse into the support under operating conditions.

SUMMARY OF THE INVENTION

Applicants have surprisingly found a composite membrane comprising an asymmetric porous support and an ultrathin polymer layer having a thickness of less than 100 nm.

In a further aspect this invention provides a process for making a composite membrane comprising the following steps:

(A) Forming an asymmetric porous support, such asymmetric porous support comprising mutually coplanar first and second regions, said first region having a microporous structure, said second region comprising a first surface integrally connected to said first region and a second surface;

(B) Preparing a dissolved polymer solution comprising (1) at least one membrane forming polymer, and (2) a solvent for the membrane forming polymer which solvent is immiscible with a selected liquid, said selected liquid being a nonsolvent for the membrane forming polymer and having a higher surface tension than said dissolved polymer solution;

(C) Depositing said dissolved polymer solution onto the surface of a pool of the selected liquid, and removing the solvent from the dissolved polymer solution to yield an ultrathin film of the membrane forming polymer; and (D) Contacting said ultrathin film of membrane forming polymer with said second surface;

yielding a composite membrane comprising an asymmetric porous support and an ultrathin membrane forming polymer film.

In one embodiment, the composite membrane according to the present invention includes a base support which is a porous structural support material having first and second mutually coplanar surfaces, which becomes integrally bonded to the asymmetric porous support when the asymmetric porous support is formed on one of the surfaces of the base support in step (A).

In further preferred embodiments, the asymmetric porous support is formed on said planar surface of the support by solvent cast phase inversion.

The invention also provides a gas separation process comprising the use of such composite gas separation membranes.

Further embodiments will be described below. The various embodiments will be detailed in the discussion below, and defined in the appended claims.

DETAILED DESCRIPTION OF THE INVENTION

The Composite Membrane in General

Figure 1:
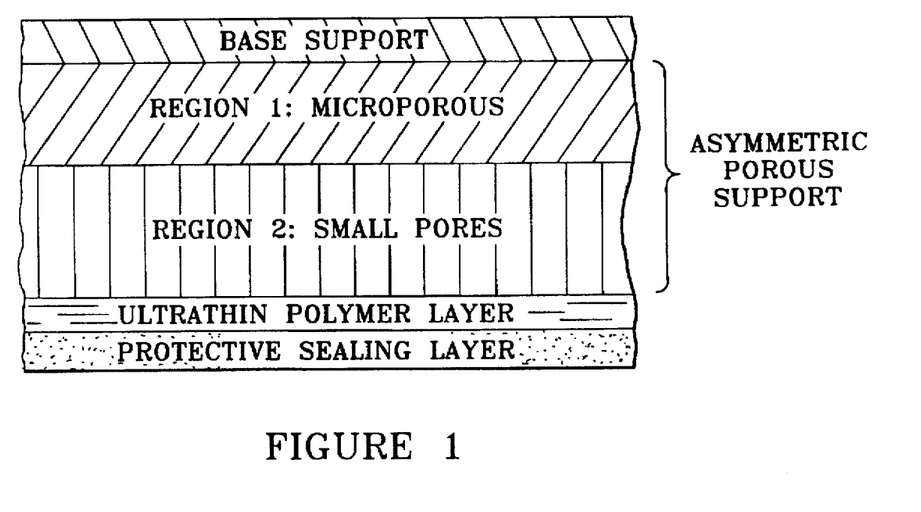
FIG. 1 is a cross-sectional schematic drawing of a composite membrane of the invention.

FIG. 1 schematically illustrates a cross-section of a composite membrane of the invention. In this embodiment, the membrane structure includes a base support, which provides mechanical strength to the composite while not excessively increasing the pressure drop across the composite membrane. While being preferred it is, however, understood that such base support may not be required and in such cases may not be present. The asymmetric porous support is formed on and integrally bonded to the base support, if present. Although it is a unitary structure, the asymmetric porous support includes two mutually coplanar, integrally connected regions 1 and 2. What we mean by "mutually coplanar" is that each of the regions is a flat, two-sided, sheet- or web-like material, and that one flat surface of each of them are integrally connected together. The ultrathin membrane forming polymer film is formed onto the asymmetric porous support, adjacent to Region 2. It is a primary goal of the invention to provide composite membranes comprising such ultrathin membrane forming polymer films having a thickness of less than about 100 nm. Hence, Region 2 must also have surface pores with a diameter of less than about 100 nm, preferably with a diameter of less than about 40 nm and more preferably with a diameter of about 20 nm to about 30 nm. Otherwise, the ultrathin membrane forming polymer film will tend to collapse into the Region 2 surface pores, both during application of the film to the asymmetric porous support, and at operating pressures during use. Region 2 must also have a relatively high density of such pores in view of their extremely small size, to avoid excessive pressure drops across the membrane. About 2% to about 6% of the surface area of Region 2 is constituted by surface pores (measured by Scanning Electron Micrographs SEM's). Given that Region 2 is designed to have exceedingly small-sized pores, Region 2 should also be quite thin in order to minimize its effect in increasing the overall pressure drop across the composite membrane. On the other hand, Region 2 must be thick enough so that it will not collapse into Region 1 during fabrication or under operating pressures. Hence, Region 2 preferably has a thickness between about 100 nm and about 250 nm. Region 1 is a cushion for Region 2 (protecting Region 2 from direct contact with the relatively rough and imperfect surface of the base support), and must balance several competing needs. On the one hand, Region 1 must provide adequate gas flux—for which large pores are preferred. On the other hand, Region 1 must provide cushioned support for Region 2, and not itself collapse under operating pressures—for which small pores are preferred. To compromise these contradictory needs, a microporous structure is needed for Region 1. By "microporous" we mean broadly that the average pore diameter in Region 1 is between about 25 microns and about 100 microns, as measured, e.g., by SEM's. The thickness of Region 1 should be balanced between (1) the role of Region 1 in cushioning Region 2 from the base support—for which the thickness should be maximized; and (2) the need to minimize overall membrane pressure drop—for which the thickness should be minimized. Broadly, the thickness of Region 1 should be between about 25 microns and about 100 microns. FIG. 1 also illustrates a nonporous protective sealing polymer layer on top of the ultrathin membrane forming polymer film. Such nonporous protective sealing polymer layer, which is optional and preferred, acts to protect the ultrathin membrane forming polymer film from abrasion, scratches, punctures and the like; and also seals any pinholes which may unavoidably be present. In particular, where (1) the composite membrane is fabricated in a sufficiently clean environment so that pinholes are not produced by dust particles deposited on the membrane components, and (2) abrasion of the membrane forming polymer layer is avoided, the nonporous protective sealing polymer layer is optional.

The Base Support

In cases where the base support becomes a permanent base layer for the composite membrane, the base support should (1) provide adequate mechanical strength and structural integrity to the overall composite; (2) present a smooth, uniform, planar (flat) surface without protruding fibers, on which the asymmetric porous support can be formed with a minimum of pinholes and other defects; and (3) contribute a minimal pressure drop to the overall composite. Preferably, the air permeability of such a base layer is about 2 to about 5 cm$^3$/(sec·cm$^2$) of base layer. In preferred embodiments, conventional gas separation membrane support cloths are employed. Such support cloths are generally high-mechanical-strength porous cloth materials which have a smooth surface and will not significantly reduce gas flux. Typically, the suitable support cloths will have a thickness on the order of about 100 to about 125 microns. Preferably, woven support cloths made from DACRON® polyester are used. Such woven support cloths tend to have a smooth and flat surface without fiber spikes/defects, which is advantageous from the standpoint of applying a smooth and uniform coating thereon. Among nonwovens, AWA reinforced papers (nonwoven cloth) grade #10, #16-1, #RO26 and #RO27 available commercially from Sanko Limited, Yokohama, Japan are the most preferred materials for use (these grades have desirably smooth surfaces). Other support cloths that can be used include HOLLYTEX® nonwoven polyester; Type 2430 polypropylene and Type 2402 polyester nonwoven cloths from Carl Freudenberg Industrial Products; and nylon support cloths.

In cases where it is desired to ultimately separate the base support from the composite membrane, such base support can be any suitable temporary support for the asymmetric porous support while such asymmetric porous support is being fabricated (and, if desired, can similarly indirectly support further layers of the composite during fabrication). For example, such base support can be a glass or metal plate; a web (optionally endless) of plastic, metal, or metal laminated with plastic such as polyethylene (MYLAR®). Those skilled in the art will be aware of a multitude of variations of these techniques and materials that can be used.

The Asymmetric Porous Support

The porous support for the ultrathin membrane forming polymer is asymmetric. By describing this porous support as asymmetric, it is specifically meant that the porous support has a thin, dense skin supported by a thick, porous substrate (matrix) having pores of an average size that gradually increases in the direction directly away from the dense skin. Therefore it has one surface area with many small pores and a second surface area with fewer and bigger pores than in the first surface area, yielding a higher porosity in the second surface area. By "surface area" we mean a two-dimensional unit surface, such as a cm$^2$ or a square inch. Any process yielding the above described type of structure can be used to prepare the asymmetric porous support. In preferred embodiments, both layers are formed from a single sol by a solvent cast phase inversion process employing a nonsolvent swelling agent. The solvent cast phase inversion process is a general process of membrane manufacture that utilizes a sol which inverts into two interdispersed liquid phases, that is, polymer coated micelles of the dispersed phase in a continuous second liquid phase, prior to, or simultaneously with gelation and immersion in a liquid precipitating bath, at which time the emulsoid nature of what once was a sol is immobilized as a gel.

Solvent cast phase inversion generally is a conventional process which has already been the subject of extensive research and teachings by others. See, e.g., Kneifel U.S. Pat. No. 4,933,085; Kneifel U.S. Pat. No. 4,818,452; Pinnau U.S. Pat. No. 4,902,422; Yamada U.S. Pat. No. 4,832,713; Peinemann U.S. Pat. No. 4,673,418; Ekiner U.S. Pat. No. 5,085,676; Hayes U.S. Pat. No. 4,944,775; Blume U.S. Pat. No. 5,085,776; Keeling U.S. Pat. No. 4,880,441; Le U.S. Pat. No. 4,853,127; and Behling U.S. Pat. No. 4,994,094.

To make an asymmetric porous support by solvent cast phase inversion, a suitable polymer is chosen to constitute the asymmetric porous support matrix structure, and then a solvent and nonsolvent (swelling agent) are selected. The solvent must dissolve the polymer and be capable of dissolving the nonsolvent as well. The nonsolvent is required in order to achieve the necessary pore structure for the asymmetric porous support. The nonsolvent must be miscible with the solvent, but must not totally dissolve the polymer. The nonsolvent must, however, be an effective swelling agent for the polymer, thus introducing pores in the polymer. Selection of the solvent and swelling agent should also take into account the quenching bath liquid to be used. The structure of the asymmetric porous support is "frozen" by quenching the nascent porous support in a precipitating bath liquid. The chosen bath liquid must be immiscible with the polymer, yet miscible with the solvent and swelling agent. The polymer, solvent and nonsolvent are then mixed in appropriate proportions and spread into a thin film on a support using e.g. a doctor knife. The thickness of the thin film preferably should be between about 8 and about 10 μm.

Preferably, for making gas separation membranes, a polyetherimide is the polymer composition for forming the asymmetric porous support. The polyetherimide employed may be a commercially available plastic (e.g., ULTEM® made by General Electric). These resins are amorphous thermoplastics. ULTEM® grades in the 1000 series (standard viscosity) are preferred, especially the "natural" type which does not contain colorants. Other structurally related polyetherimides can also be used if they are soluble in one of the solvents mentioned below. Using ULTEM® 1000 polyetherimide polymer resin, asymmetric porous supports can be prepared having, in Region 2 (the dense skin), a porosity of about 2–10%, preferably 4–8%, especially preferred between about 6.2% and about 6.6% (based on the total surface area, length-width, of the face of the asymmetric porous support), the average pore diameter being about 2–50 nm, preferably about 10–15 nm, especially preferred in between about 12.8 nm and about 13.8 nm, the number of such pores per unit surface area being about $10^{10}$–$10^{11}$ pores/cm$^2$, preferably about $3\times10^{10}$–$8\times10^{10}$ pores/cm$^2$, especially preferred in between about $4.3\times10^{10}$ pores/cm$^2$ and about $4.8\times10^{10}$ pores/cm$^2$ (these parameters can be determined by SEM measurements).

The polyetherimides used herein are polymers having a molecular weight of 10,000 to 50,000 and preferably 25,000 to 40,000, and can be prepared by condensation reaction of phenoxy-phenyldicarboxylic acid anhydrides (such as 2,2-bis-4-(3,4-dicarboxyphenoxy) phenyl propane anhydride) and phenylenediamines (such as methaphenylenediamine). In the phenoxyphenyl-dicarboyxlic acid anhydrides, the carboxy and phenoxy groups may be located at 3,3'-4,4'- or 3,4'-positions. In addition, a mixture of such 3,3'-, 4,4'- and 3,4'-substituted compounds may be used. Although it is most preferred for the propane to take a —C(CH$_3$)$_2$-structure, it may be —CH$_2$—CH$_2$—CH$_2$— or —CH$_2$—CH(CH$_3$)—. In C$_n$H$_{2n}$- other than the propane, n may be within the range of 1 to 8.

Suitable polyetherimide polymers are disclosed in Ekiner U.S. Pat. No. 5,085,676 and Yamada U.S. Pat. No. 4,832,713. Methods for preparing suitable polyetherimides are disclosed in, for example, Heath et al. U.S. Pat. No. 3,847,867, and Verbicky, Jr. et al U.S. Pat. No. 4,774,317.

The polyetherimide can be dissolved in tetrahydrofuran, dioxane, dimethylacetamide, N-methyl-2-pyrrolidone, dimethyl sulfoxide, and other nitrogen-containing cyclic solvents such as N-formylpiperidine and 1-formylmorpholine. The nitrogen-containing cyclic solvents exhibit a high ability to dissolve the polyetherimide or the polymer mixture, even up to a concentration of about 30% by weight. Thus, of the solvents as described above, the nitrogen-containing cyclic solvents are particularly preferred. The polymer concentration determines porosity; if the concentration is too high, the size of the asymmetric porous support pores will be too small; if the concentration is too low, the size of the pores in the asymmetric porous support will be too large. The polymer concentration for a particular polymer-solvent-nonsolvent solution can best be optimized on a case by case basis. Generally, however, the polymer concentration in the solvent should be between about 5 and about 40% by weight, and preferably 15 to 25% by weight.

It is also necessary to add to the above-described solvent or solvent mixture a pore-forming substance (swelling agent). The swelling agent should be a nonsolvent for the polyetherimide. The swelling agent must not react with the polyetherimide or with the solvent. Examples of swelling agents include: acetic acid, toluene, xylene, gamma-butyrolactone, and dimethyl sulfoxide. The swelling agent concentration in the polymer-solvent-nonsolvent solution may lie between 5 and 40 weight percent.

With ever-increasing pressure to reduce the use of chemical solvents in response to worker safety and health issues, environmental emission controls, and solvent cost, water is the precipitating agent of choice. All organic liquids which are nonsolvents for polyetherimide but are completely miscible with all other components of the polymer-solvent-nonsolvent solution can be used as membrane precipitation agents. The precipitation agent can be used to influence the pore structure and thickness of the dense skin of Region 2. The quench may also contain organic or inorganic additives to alter the thermodynamic activity of the quench components, thereby altering the influx rate of the quench components into the nascent asymmetric porous support.

Other thermoplastic resins can be used for forming the porous support, although as stated above, polyetherimides are preferred. A second choice for gas separation membranes is polyacrylonitrile, such as a copolymer of 94% polyacrylonitrile and 6% polymethylacrylate made by DuPont under the name Polymeric Acrylonitrile Type A-7 ("PAN A-7"), having a weight average molecular weight of 100,000, which also contains a minor amount of certain unknown copolymer additives. Polyamides such as a solution of 25% by weight in dimethylacetamide of the lithium chloride salt of a polyamide polymer having the structure of:

and NOMEX® from DuPont, may be suitable. UDEL®-3500 polysulfone resin available commercially from Amoco Oil Company can be used (the swelling agent often can be omitted). VICTREX®5200G polyethersulfone resin (viscosity 10300 centipoise) and VICTREX® 300P polyethersulfone resin available commercially from Imperial Chemicals Inc. - Americas can likewise be used. Other types of polymers that may be effective for particular applications include polyetherketones and cellulose acetate. Further disclosures of polymers for making asymmetric porous supports are found in Bikson U.S. Pat. No. 5,067,971; Yamada U.S. Pat. No. 4,832,713; Kraus U.S. Pat. No. 4,964,990; Blume U.S. Pat. No. 4,963,165; and Baker U.S. Pat. No. 4,857,080.

The Ultrathin Polymer Membrane

As we have already summarized above, the Hoehn, Hayes and Ekiner patents all relate to 6FDA-type-polyimide polymers which are polymers which may be employed in the present invention for forming the ultrathin membrane layer. We hereby incorporate these three patents by reference in their entirety, and will rely on and refer to their teachings. Further 6FDA-type polyimide polymers which can be used to form the ultrathin membrane forming polymer films of the invention are disclosed in the following U.S. patents: Hayes U.S. Pat. No. 4,707,540; Hayes U.S. Pat. No. 4,717,393; Makino U.S. Pat. No. 4,528,004; Makino U.S. Pat. No. 4,690,873; Makino U.S. Pat. No. 4,474,858; Makino U.S. Pat. No. 4,440,643; Makino U.S. Pat. No. 4,460,526; Makino U.S. Pat. No. 4,474,662; Makino U.S. Pat. No. 4,485,056; Makino U.S. Pat. No. 4,512,893; Makino U.S. Pat. No. 4,378,324; Ekiner U.S. Pat. No. 5,015,270; Ekiner U.S. Pat. No. 4,983,191; Hayes U.S. Pat. No. 4,932,983; Hayes U.S. Pat. No. 5,178,650; Hayes U.S. Pat. No. 5,034,024; Kusuki U.S. Pat. No. 5,141,642; Strathman U.S. Pat. No. 4,071,590; and Manwiller U.S. Pat. No. 4,622,384. In sum, the term "6FDA-type polyimide" for purposes of this invention includes and is constituted by the above-discussed disclosures of all such polymers included in these patents. 6FDA itself is the dianhydride of choice for producing 6FDA-type polyimides. (The synthesis of 6FDA itself is disclosed, e.g., in Scola U.S. Pat. No. 4,569,988).

Further polymers which can be employed as membrane forming polymers according to this invention include cellulose triacetate (CTA)

with an average degree of acetylisation typically in the range of about 2.5 to 3.0;

hexafluoropolysulfones (6F-PS) like polytrimethylsilylpropyne (PTMSP)

polysulfones (PS)

with $R^1$ and $R^2$ representing bivalent organic radicals;

polyethersulfones (PES)

with $R^1$ and $R^2$ representing bivalent organic radicals. Examples of such polyethersulfones are compounds according to the formulae

Further membrane forming polymers include poletherimides (PEI)

with $R^1$ and $R^2$ representing bivalent organic radicals; such as

Further membrane forming polymers include polycarbonates (PC)

with R representing a bivalent organic radical;

and polypropylene oxide (PPO)

(n in all of the above formulae representing the average number of repetitive units per molecule).

It is essential to provide the membrane forming polymer films in an ultrathin form: that is, having a thickness of less than about 100 nm, preferably less than about 40 nm and most preferably about 20 to about 30 nm. Although it is not readily feasible to directly measure such small thickness dimensions, they can be measured indirectly. For example, a petri dish can be weighed before and after an ultrathin membrane forming polymer film of measurable dimensions is picked up on top of the dish. Then, using the formula volume=mass/density, and separately measuring the density of a large sample of the membrane forming polymer, the thickness of the ultrathin film can be calculated.

Alternatively, a known mass of membrane forming polymer can be cast on a surface having a known surface area (length width), and the thickness can be calculated using the same formula. It is further essential to provide the membrane forming polymer films with such low roughness that they do not protrude into the pores of the porous support. Evenness or low roughness is also important for a homogeneous membrane performance over a given surface area. The ultrathin membrane forming polymer films of the composite membranes according to the invention have a roughness of about ±0.5 to 5 nm, preferably about ±1 to 3 nm, even more preferred of about ±1.5 to 2.5 nm. "Roughness" in this context means that the thickness of the ultrathin film varies with these numbers (i.e. thickness ± about 2 nm).

Some membrane forming polymers usefull in practicing the invention are identified in TABLE 1 below; our abbreviated designations for these polymers are also given. Relative proportions, where given, are molar amounts.

TABLE 1

| DESIGNATION | MONOMERS/PROPORTIONS |
|---|---|
| 6FDA-F33 | 6FDA + 3,3'-DIPHENYLHEXAFLUOROISOPROPYLIDENE DIAMINE |
| 6FDA-6F44 | 6FDA + 4,4'-DIPHENYLHEXAFLUOROISOPROPYLIDENE DIAMINE |
| 6FDA-DB | 6FDA + 1,3-DIAMINOBENZENE |
| 6FDA-DUR | 6FDA + 2,3,5,6-TETRAMETHYL-1,4-PHENYLENEDIAMINE |
| 6FDA-NDA | 6FDA + 1,5-DIAMINONAPHTHALENE |
| 6FDA-ABN | 6FDA + 3,5-DIAMINOBENZONITRILE |
| 6FDA-BENZOATE | 6FDA + 3,5-DIAMINOMETHYLBENZOATE |
| 6FDA-DURS | 6FDA + 50% 2,3,5,6-TETRAMETHYL-1,4-PHENYLENEDIAMINE + 50% 3,3'-DIAMINOPHENYLSULFONE |
| 6FDA-DBNDA | 6FDA + 50% 1,3-DIAMINOBENZENE + 50% 1,5-DIAMINONAPHTHALENE |
| 6FDA-3,4 SULFONE | 6FDA + 50% 3,3'-DIAMINOPHENYLSULFONE + 50% 4,4'-DIAMINOPHENYLSULFONE |
| 6FDA-STSN | 6FDA + 50% 3,3'-DIAMINOPHENYLSULFONE + 50% 3,7-DIAMINO- |

TABLE 1-continued

| DESIGNATION | MONOMERS/PROPORTIONS |
|---|---|
| | 2,8-DIMETHYLDIPHENYLENESULFONE |
| | 6FDA + 75% 3,3'-DIAMINOPHENYLSULFONE + 25% 3,7-DIAMINO- |
| 6FDA-3STSN | 2,8-DIMETHYLDIPHENYLENESULFONE |
| 6FDA-SNDA | 6FDA + 50% 3,3'-DIAMINOPHENYLSULFONE + 50% 1,5-DIAMINO-NAPHTHALENE |
| 6FDA-DBS | 6FDA + 50% 1,3-DIAMINOBENZENE + 50% 3,3'-DIAMINO-PHENYLSULFONE |
| MATRIMID | 3,3',4,4'-BENZOPHENONE TETRACARBOXYLIC DIANHYDRIDE + 5(6)AMINO-1-(4'-AMINOPHENYL)-1,3,3,-TRIMETHYLINDANE |
| CTA | CELLULOSETRIACETATE WITH A DEGREE OF SUBSTITUTION OF 2.84 (ACETYL CONTENT: 43.3–43.9 WT %) |
| HEXAFLUOROPOLY-SULFONE | BIS-(p-CHLORPHENYL)SULFONE + HEXAFLUOROBISPHENOL-A |
| PES | p-PHENOXY-PHENYLSULFONYLCHLORIDE |
| TETRAMETHYL-METHYLENE-POLYSULFONE | BIS-(p-CHLORPHENYL)SULFONE + TETRAMETHYLMETHYLENE-BISPHENOL |
| PTMSP | TRIMETHYLSILYLPROPYNE |

Membranes made with 6FDA-ABN (6FDA+3,5-diaminobenzonitrile) are particularly effective in separating nitrogen/oxygen mixtures. The 6FDA-STSN, 6FDA-3STSN and 6FDA-SNDA polyimides are preferred for use in separating carbon dioxide from hydrocarbons such as methane, ethane, propane, etc.; and the 6FDA-NDA and 6FDA-ABN polyimides are preferred for use in carrying out air separations. In addition to these 6FDA-type polyimides, other polymers made using closely-analogous aromatic diamines are also preferred for use. For example, the —CN group in 3,5-diaminobenzonitrile can be replaced by —CF$_3$, —COOH, —Cl, —Br, —OR —OH. The —COOH type is particularly desirable because of the close molecular packing which it has due to hydrogen-bonding. Another preferred diamine is 2-carboxy-3,5-diaminotoluene.

The 6FDA-type polyimide polymers are synthesized by conventional techniques thoroughly reviewed in the above-listed prior art references.

CTA can be purchased from Eastman Company, Tennessee. It can also be made from commercially available cellulose by subjecting cellulose to an acetylisation reaction. Typically employed CTA has a degree of acetyl substitution of about 2.5 to about 3.0 and an acetyl content of about 40 to about 44 weight-%.

6F-PS can be obtained from reacting commercially available bis(p-chlorophenyl)-sulfone with hexafluorobisphenol-A.

PTMSP can be purchased from Air Products Laboratory.

PES especially polyarylethersulfone can be purchased from BASF Corp. under the tradename ULTRASON E6010 Q691_NATURAL. It can also be made from p-phenoxyphenylsulfonylchloride by condensation reaction. PEI can be purchased from General Electric Company Tetramethylmethylenepolysulfone can be obtained by reacting bis-(p-chlorophenyl)-sulfone with tetramethylmethylenebisphenol.

PPO can be purchased from Polysciences.

The Silicone Protecting Layer

The ultrathin membrane forming polymer layer of the composite membranes of the invention is vulnerable as the top, exposed composite membrane layer, to abrasion and tearing as a result of any unintended contact with foreign materials in handling or use. Therefore, in preferred embodiments, a nonporous protective sealing polymer layer is applied over the ultrathin membrane forming polymer layer. Any materials taught in the art as useful for forming a nonporous protective sealing polymer layer on a gas separation selective membrane can be employed, so long as the material and the solvent used to dissolve it during coating, do not dissolve or react with the ultrathin membrane forming polymer layer. Particularly preferred for use as nonporous protective sealing polymer layer are the SYLGARD® silicones (e.g., SYLGARD® 184 and 186, which are thermally-curable polydimethylsiloxanes) available from Dow Corning Corporation (these materials are elastomeric silicones which thermally cure to a nonporous crosslinked silicone materials having high permeability). The use of these materials as non porous protective sealing polymer layers and methods for their application are disclosed, for example, in: Henis et al U.S. Pat. No. 4,230,463 (see, e.g., the Examples); and Ekiner U.S. Pat. No. 5,085,676 (see, e.g., the Examples). Another silicone composition that can be used is an Ultraviolet curable antimony-complex (GE 9310C) catalyzed silicone supplied by the General Electric Company. Yet another is a thermally curable platinum-complex (PC-072) catalyzed silicone supplied by Dow Corning Chemical Company. The platinum catalyst PC072 and the cross-linker PS123 (to accelerate curing) are obtained from the Huls Petrarch Systems.

Optional Gutter Layer

Ideally, the ultrathin membrane forming polymer layer is formed directly on the asymmetric porous support. The two-layer composite then combines optimum selectivity, gas flux and mechanical durability. However, there are circumstances in which it is desirable to interpose a gutter layer between the ultrathin membrane forming polymer layer and the asymmetric porous support, in order to facilitate and improve the combination of such membrane materials. In this regard, reference is made to applicant's copending U.S. patent application Ser. No. 07/999,449, now U.S. Pat. No. 5,286,280 entitled "Composite Gas Separation Membrane Having A Gutter Layer Comprising a Crosslinked Polar Phenyl-Containing Organopolysiloxane And Method For Making The Same" (which is hereby incorporated by reference). That application discloses such gutter layers and processes for their fabrication, which can be employed in conjunction with the present invention if desired.

Combination of Functional Membrane Layers

Optionally, more than one ultrathin membrane forming polymer layer can be formed on the same asymmetric porous support. If desired, two or more different membrane forming polymers having different gas flux capacities can be used. For example, a membrane forming polymer having a particularly high flux rate can be formed on the asymmetric porous support before adding a second layer formed from a membrane forming polymer having a lower flux. In TABLE 2 below, we provide calculated film thicknesses, based on the measured permeance and the calculated fluxes of 50 and 20 nm films.

TABLE 2

THIN FILM COMPOSITE MEMBRANE THICKNESS
CALCULATED FROM THE DENSE FILM

| EXAMPLE | MEMBRANE FORMING POLYMER | CALCULATED THICKNESS |
|---|---|---|
| 1 | 6FDA-SNDA | 20.3 nm |
| 3 | 6FDA-DURS | 77.3 nm |
| 4 | 6FDA-DBS | 34.7 nm |
| 5 | 6FDA-DBNDA | 82.1 nm |
| 6 | 6FDA-3,4SULFONE | 47.1 nm |
| 7 | 6FDA-NDA | 29.8 nm |
| 8 | 6FDA-DB | 52.4 nm |
| 10 | 6FDA-ABN | 55.8 nm |
| 11 | 6FDA-BENZOATE | 40.4 nm |
| 12 | 6FDA-6F44 | 96.2 nm |
| 13 | 6FDA-6F33 | 25.2 nm |
| 14 | MATRIMID | 77.1 nm |
| 15 | CTA | 32.7 nm |
| 16 | HEXAFLUOROPOLY-SULFONE | 135.6 nm |
| 17 | PES | 49.9 nm |
| 18 | TETRAMETHYL-METHYLENE-POLYSULFONE | N/A (because standard values for intrinsic permeability are not available) |
| 19 | PTMSP | N/A (because intrinsic permeability changes due to exposure to UV radiation) |

Process for Making the Membrane

In general the process for making the composite membrane according to the invention comprises:

providing a pool of a selected bath liquid;

spreading out a solution of the membrane forming polymer onto the surface of the pool;

removing the solvent from the membrane forming polymer solution, yielding an ultrathin film of the membrane forming polymer floating on the surface of the pool; and picking up and depositing this ultrathin film onto the surface of a porous support.

In order to carry out the lamination of the ultrathin membrane forming polymer film onto the asymmetric porous support, a solvent for the membrane forming polymer and an appropriate bath liquid are selected. Water is the preferred bath liquid from a standpoint of nontoxicity; it also has a desirably high surface tension (about 76 dyne/centimeter). Any other liquid having an adequately high surface tension and compatible with the composite membrane materials can be used as the bath liquid. Those skilled in the art can identify other materials for use as the selected bath liquid. We will refer specifically to water as the selected bath liquid. This bath liquid is then provided in a pool.

The membrane forming polymer must be dissolved in a suitable solvent. There are two requirements that must both be satisfied by the chosen solvent: (1) the resulting solution of membrane forming polymer in the solvent must have a lower surface tension than the selected bath liquid (water); and (2) the solvent must be immiscible with the selected bath liquid (water). Suitable solvents that pass both of these tests include the following: a mixture of 1,2,3-trichloropropane (10–80 wt %) and methylene chloride (90–20 wt %); a mixture of 90–50 wt % dichloromethane and 10–50 wt % 1,2,3-trichloropropane; chloroform; a mixture of 90–50 wt % chloroform and 10–50 wt % 1,2,3-trichloropropane; a mixture of 90–50% dichloroethane and 10–50 wt % 1,2,3-trichloropropane; 1,2-dichloroethane; other halogenated hydrocarbons (which generally have a low surface tension, e.g., about. 20 dyne/centimeter); a mixture of 1,2,3-trichloropropane and ortho-dichlorobenzene (1:1 to 10:1 volumetric proportions); butyl acetate; propyl acetate; toluene; and tetrahydrofuran. Butyl acetate is most effective in solubilizing 6FDA-type polyimide polymers in which both the diamine and the dianhydride used to synthesize the 6FDA-type polyimide polymer have $F_3C+CF_3$ ("6F") moieties. Other generally suitable solvents having a higher boiling point than 1,2,3-trichloropropane include chloroform (60.9° C.), and 1,2-dichloroethane (83° C.). The solvent system used must evaporate slowly enough so that the membrane forming polymer can spread into an ultrathin film on the surface of the water pool, and quickly enough so that the membrane forming polymer film has solidified by the time it reaches the point where it is picked up.

A current is generated in the water pool so that the spread out polymer solution is carried away from its point of contact with the water pool towards a point where the solidified polymer film is picked up by the porous support. The speed of the surface of the water bath is adjusted to be slow enough so that the polymer solution has enough time to solidify into a solid film before reaching the pickup point, and fast enough so that the polymer solution being deposited on the surface of the water pool does not cover previously deposited solution—which results in uneven polymer film thickness.

From a reservoir (roll) the asymmetric porous support is continuously fed towards a pickup point, where it contacts the ultrathin polymer film. After contacting the ultrathin polymer film, which results in a lamination of both films (porous support+ultrathin film), the laminate is carried away from the water pool and subsequently wound up. The speed of the asymmetric porous support web as it passes by the pickup point is regulated to match the speed of advance of the membrane forming polymer film on the surface of the water pool, so that the asymmetric porous support and membrane forming polymer film join together at the pickup point without crinkling or tearing of the membrane forming polymer film. It is preferred that the asymmetric porous support picks up the membrane forming polymer film from below the surface of the water pool so that there is less danger of entrapping air in between the two layers. Optionally, the newly-formed composite membrane can be directed over a vacuum device such as a vacuum roller or ramp to remove any residuals of water and solvents.

Utility

The composite membranes of this invention can be applied to a wide variety of gas separation end uses. For example, the composite membranes can be used to separate methane from nitrogen, carbon dioxide and/or helium. The composite membranes can also be used for the separation of oxygen from air to provide enriched oxygen to provide enhanced combustion; for the separation of nitrogen from air to provide inerting systems; for the separation of hydrogen and/or nitrogen from ammonia; in the recovery of hydrogen from hydrocarbon gas in refinery plants; for the separation of carbon monoxide from hydrogen in syngas systems; for the separation of carbon dioxide or hydrogen sulfide from hydrocarbons; and for the separation of helium from air, oxygen or nitrogen. Further, the membranes of the invention may have application outside gas separation, e.g., in microfiltration, reverse osmosis, pervaporation, vapor separation, organic vapor dehydration, and dehumidification.

The composite gas separation membranes of the invention can be configured in a variety of types of modules. The various types of modules can then further be incorporated, as well known by those skilled in the art, into "systems", by which we mean, e.g., skid-mounted turnkey apparatus including modules, instrumentation, pressure-, temperature-, and flow-controlling equipment, piping and other components into which feed gas to be processed is piped in from its source.

EXAMPLES

Before reporting on the experiments below, we provide some needed terminology.

When a gas species passes through a membrane, the flow rate Q is proportional to the area A of the membrane, and the pressure difference $\Delta p$ across the membrane, but reciprocally proportional to the thickness L of the membrane. That is, $$Q = (P \cdot A \cdot \Delta p)/L$$

where P is a characteristic of the membrane, the proportion constant named "permeability". The permeability P of the membrane varies with the gas species and the operation conditions such as temperature, pressure, and the gas composition if gas mixtures are used. The thickness L of the membrane usually is difficult to define or measure when the membrane is in asymmetric or ultrathin form, the latter of which is only a couple of nm to about 200 nm thick. Therefore, in practice, the ratio P/L of permeability to thickness, which is hereinafter called "permeance" is used as a measure of the performance of the membrane. That is, according to the previous equation, $$P/L = \frac{Q}{A \cdot \Delta p}$$

where Q, A and $\Delta p$ are easily measurable. In this formula the units we use are:

| | |
|---|---|
| Q: [standard cubic feet per hour, or SCCS] | (std. cm$^3$/sec or SCCS) |
| A: [ft$^2$] | (929 cm$^2$) |
| $\Delta p$: (100 psi) | (517 cm Hg) |
| P/L: [SCFH/ft$^2$/100 psi] | (6.1 · 10$^{-6}$ cm$^3$ (STP)/ cm$^2$ · sec · cm · Hg) |

The selectivity $\alpha$ of a membrane (also called separation factor) in separating two gas species A and B from each other is defined as the ratio of their gas permeances in that membrane. That is, $$\alpha_{(A/B)} = \frac{(P/L)_A}{(P/L)_B}$$

The selectivity $\alpha(A/B)$ can be obtained by measuring the gas permeance of each gas in pure gas state or in mixed gas state. The selectivity is a measure of how well the membrane can separate the gases while the permeance is a measure of how fast the membrane can let the gases pass through. In most applications, the membrane is made to maximize both permeance and selectivity.

Preparation of Asymmetric Porous Supports

The polymer used to fabricate the asymmetric porous supports for the EXAMPLES below was a polyetherimide supplied by General Electric Company under the trade name Ultem® 1000, referred to as Ultem® hereinafter. For each EXAMPLE, a 15 to 20% by weight (preferably between 18 and 19% by weight) Ultem® casting solution was prepared by dissolving the polymer in equal amounts by weight of dimethylsulfoxide (DMSO) and 1-methyl-2-pyrrolidinone (NMP) solvents at about 80 to 90° C. The Ultem® 1000 has an average molecular weight of about 32,000 grams/mole. The solvents for making the asymmetric porous support were reagent grade solvents purchased from Fisher Scientific Corporation.

The Ultem® casting solution was first filtered through a 5 micron filter and then subjected to vacuum for about 5 hours in order to eliminate air bubbles. The resulting dope solution was casted on a smooth DACRON® polyester backing in a thickness of 76 μm to 89 μm by means of a doctor knife. The nascent solution film was immediately immersed in water at room temperature to coagulate the polymer and to wash out both DMSO and NMP solvents. The thus formed membrane was carefully washed with water to remove residual solvent and dried by passing it through an oven at 50° to 60° C.

ULTRATHIN MEMBRANE FORMING POLYMER FILM PREPARATION

Materials:

5,5'-2,2,2-trifluoro-1-(trifluoromethyl) ethylidene-bis-1, 3-isobenzofuranedione (6FDA) was obtained from Hoechst Celanese Corporation (commercially available) and was used as received. 3,3'-diaminophenylsulfone, 3,7-diamino-2,8-dimethyldiphenylenesulfone, and 4,4-diaminophenylsulfone were purchased from Ken Seika Corporation (respectively designated by Ken Seika as 3,3-DDS; 4,4-DDS; and TSN) and used as received. 1,3-diaminobenzene, 2,3,5,6-tetramethyl-1,4-phenylenediamine, 3,5-diaminobenzoic acid, 3,5-dinitrobenzonitrile and 1,5-diaminonaphthalene were supplied by Aldrich Chemical Company; they were recrystallized before being used. 3,5-diaminomethylbenzoate and the 3,5-diaminobenzonitrile were synthesized from 3,5-diaminobenzoic acid (commercially available from Aldrich Chemical Company; esterified to form the benzoate) and 3,5-dinitrobenzonitrile (reduced to the diamino form) respectively. CTA purchased from Eastman Company, Tennessee, designated CA435-75. It had a degree of acetyl substitution of 2.84 and an acetyl content of 43.3 to 43.9 weight-%. Polyphenylethersulfone was purchased from BASF Corp. Parsippany, N.J., designated ULTRASON® E6010 Q691_NATURAL. PTMSP was purchased from Air Products Laboratory, Allentown, Pa. The solvents used in synthesizing the polymers and for the process of making the ultrathin membrane forming polymer films were high performance liquid chromatography grades purchased from Aldrich Chemical Company, Milwaukee, Wis. The MAT-RIMID polyimide is sold under the trade name Araldite® XU 218 by the Ciba-Geigy Corporation.

The Plyimide Polymers Were Prepared as Follows:

The 6FDA-type-polyimides employed in these examples were either condensation polymers of 6FDA and a diamine or condensation copolymers of 6FDA and a diamine mixture (the MATRIMID example (#14) being an exception), because there the 6FDA is replaced by 3,3',4,4'-benzophenone-tetracarboxylic dianhydride. The reaction partners for forming the polyimides of the EXAMPLES are reported in TABLE 3, below. In the preparation of 6FDA-type polyimides 100 mole-% of the diamine or corresponding diamine mixture (typically a 50:50 mole-% mixture) was first dissolved in N,N-dimethylacetamide (DMA). To this was added 100 mole-% (stoichiometric amount) of 6FDA. After about 24 hours of tumbling the mixture in a closed container at ambient temperature, the resulting viscous polyamic acid solution was then dehydrated by reaction with acetic acid anhydride in the presence of pyridine at 80 to 100° C. for one hour. The resulting polyimide solution was then slowly precipitated in a large excess of methanol under vigorous agitation. The polyimide was then recovered by filtration, washed twice with methanol and dried under vacuum, first for 16 hours at room temperature and then for 5 hours at 100° C.

The resulting 6FDA-type-polyimide was then dissolved in a solvent mixture containing 75% by weight of dichloromethane (DCM) and 25% by weight of 1,2,3-trichloropropane (TCP), degassed, and filtered through a 0.5 micron Teflon® membrane supplied by Millipore Corporation before being used.

Preparation of Hexafluorpolysulfone and Tetramethylmethylenepolysulfone

Hexafluorpolysulfone was synthesized from bis(p-chlorphenyl)-sulfone and hexafluorobisphenol-A. Tetramethylmethylenepolysulfone was synthesized from bis(p-chlorphenyl)-sulfone and tetramethylmethylenebisphenol.

TABLE 4 lists EXAMPLES 15 to 19 with their respective chemical formulae. Index "n" in these formulae indicates the average number of repetitive units per molecule.

TABLE 3

FORMULATIONS FOR CONDENSATION REACTIONS YIELDING 6FDA-POLYIMIDE

| EXAMPLE - NAME | 6FDA | DIAMINE I | AMOUNT | DIAMINE II | AMOUNT |
| --- | --- | --- | --- | --- | --- |
| (1) 6FDA-SNDA | 100 mole % | 3,3'Diaminophenylsulfone | 50 mole % | 1,5 Diaminonaphthalene (158.2) | 50 mole % |
| (2) 6FDA-STSN | 100 mole % | 3,3'Diaminophenylsulfone | 50 mole % | 3,7 Diamino-2,8 Dimethyldiphenylenesulfone | 50 mole % |
| (3) 6FDA-DURS | 100 mole % | 3,3'Diaminophenylsulfone | 50 mole % | 2,3,5,6-tetramethyl-1,4-phenylenediamine | 50 mole % |
| (4) 6FDA-DBS | 100 mole % | 3,3'Diaminophenylsulfone | 50 mole % | 1,3 Diaminobenzene | 50 mole % |
| (5) 6FDA-DBNDA | 100 mole % | 1,3 Diaminobenzene | 50 mole % | 1,5 Diaminonaphthalene | 50 mole % |
| (6) 6FDA-3,4-sulfone | 100 mole % | 3,3'Diaminophenylsulfone | 50 mole % | 4,4' Diaminophenylsulfone | 50 mole % |
| (7) 6FDA-NDA | 100 mole % | 1,5 Diaminonaphthalene | 100 mole % | | |
| (8) 6FDA-DB | 100 mole % | 1,3 Diaminobenzene | 100 mole % | | |
| (9) 6FDA-DUR | 100 mole % | 2,3,5,6-Tetramethyl-1,4-Phenylenediamine | 100 mole % | | |
| (10) 6FDA-ABN | 100 mole % | 3,5 Diaminobenzonitrile | 100 mole % | | |
| (11) 6FDA-BENZOATE | 100 mole % | 3,5 Diamino-Methylbenzoate | 100 mole % | | |
| (12) 6FDA-6F44 | 100 mole % | 4,4'-Diphenylhexafluoroisopropylidenediamine | 100 mole % | | |
| (13) 6FDA-6F33 | 100 mole % | 3,3'-Diphenylhexafluorolsopropylidenediamine | 100 mole % | | |

TABLE 4

CHEMICAL FORMULAE OF EXAMPLES 15 TO 19

| EXAMPLE-NAME | FORMULA |
| --- | --- |
| (15) CELLULOSETRIACETATE | [structure of cellulose triacetate with CH$_2$OAc, OAc groups]$_n$ |
| (16) HEXAFLUOROPOLY-SULFONE | [—O—C$_6$H$_4$—C(CF$_3$)$_2$—C$_6$H$_4$—O—C$_6$H$_4$—S(=O)$_2$—C$_6$H$_4$—]$_n$ |
| (17) PES | [—O—C$_6$H$_4$—S(=O)$_2$—C$_6$H$_4$—]$_n$ |

TABLE 4-continued

CHEMICAL FORMULAE OF EXAMPLES 15 TO 19

| EXAMPLE-NAME | FORMULA |
|---|---|
| (18) TETRAMETHYL-METHYLENE-POLYSULFONE |  |
| (19) PTMSP |  |

Forming Film of Memebrane Forming Polymer on the Ultem® Asymmetric Porous Support The membrane forming polymer solution was deposited through a precision medical injection pump first on a stainless steel ramp and then allowed to flow down onto a water bath having two motor driven endless roller belts inside the walls of the bath which moved the water in a direction away from the ramp to a point downstream where it overflowed at the end of the bath. The temperature of the water was set between 10 to 25° C. (preferably 15 to 18° C.) and the water overflow rate was also adjusted between 1.5 to 2.0 gallons per minute (GPM). The solution spread rapidly over the surface of the water as the casting solvent evaporated to form an ultra thin film. After allowing the ultrathin film to travel between 30 to 60 cm away from the ramp, the film was continuously drawn from the surface of the water by the porous Ultem® asymmetric support. The composite membrane (membrane forming polymer on Ultem® support) was immediately dried an oven at a temperature between 60 to 70° C. to remove the water trapped between the ultrathin film and the asymmetric porous support and all the residual solvents remaining in the ultrathin film. These steps were performed in a class 10,000 clean room.

Preparation of the Thermally Cured Silicone

A platinum-complex catalyst PC072 was diluted to a 1% solution by weight in heptane. A mixture of Sylgard® 184 (5 parts), PS123 (30–35%) methylhydro (65–70%) dimethylsiloxane copolymer crosslinker (1 part), heptane (69 parts), and the diluted PC072 (0.002 parts) was placed in a sealed bottle and tumbled for approximately 20 minutes. The resulting partially cured silicone polymer solution was filtered and degassed before use.

Coating of the Thermally Curable Silicone to Form the Sealing Layer

The partially cured silicone polymer prepared as shown above was solution coated onto the composite membrane by a meniscus coating process at a constant speed (preferably between 30 to 150 cm/min). After the solvent (heptane) was all allowed to evaporate in ambient air the coated composite (siloxane/membrane-forming-polymer/Ultem®/backing cloth) was post-cured in an oven at 65° to 70° C. for 15 to 20 minutes to complete the cross-linking reaction of the silicone. The silicone coating process was carried out in a class 10,000 clean room.

Preparation of the UV Cured Silicone

The antimony catalyzed UV curable silicone was prepared by mixing 8 wt. parts of GE9315 polydimethylsiloxane resin (available from the General Electric Silicones Division) with 0.16 wt. parts of GE9310C catalyst in 92 wt. parts of heptane. The resulting solution was mixed at ambient temperature for 10 to 15 minutes and filtered before use.

Coating of the Ultraviolet Curable Silicone to Form the Sealing Layer

The antimony catalyzed UV curable silicone solution was solution coated onto the composite membrane by a meniscus coating process at a constant speed (preferably between 30 to 150 cm/min). After the solvent (heptane) was evaporated in ambient air the composite membrane (silicone/membrane-forming-polymer/Ultem®-support/backing cloth) was exposed to a short wave ultraviolet light for two minutes at ambient temperature to cure the silicone. Finally the UV cured composite membrane was dried in an oven at 65° to 70° C. for 10 to 15 minutes to remove any residual solvent. This coating process was also performed in a class 10,000 clean room.

Gas Transport Performance of the Composite Membrane

Except in special cases, the gas permeance and selectivity for the composite membranes were measured at 50° C. using mixed gases. The feed-side pressure was 5170 cm Hg for carbon dioxide/methane, carbon dioxide/nitrogen, carbon dioxide/methane/ethane/propane, carbon dioxide/methane/hexane, carbon dioxide/methane/butane, carbon dioxide/methane/butene, carbon dioxide/methane/m-xylene, carbon dioxide/methane/toluene, carbon dioxide/methane/cyclohexane mixtures and 1034 cm Hg at ambient temperature for oxygen/nitrogen. The permeate-side pressure was atmospheric pressure for all measurements.

TABLE 5 summarizes the gas permeance and selectivity for membranes made according to Examples 1–21 under various test conditions. The proportions of all gas mixtures are given in relative molar amounts.

| Example No. | protecting layer | feed gas composition | permeance [std. ft³/h · ft² at 100 psi] (6.1 · 10⁻⁶ cm³ (STP)/cm² · sec · cm Hg) | | | | selectivity | | |
|---|---|---|---|---|---|---|---|---|---|
| | | | $N_2$ | $CH_4$ | $CO_2$ | $O_2$ | $CO_2/N_2$ | $CO_2/CH_4$ | $O_2/N_2$ |
| 1 | GE 9315 | 10% $CO_2$ IN $CH_4$ | — | 0.418 | 12.2 | — | — | 29.3 | — |
| | | 10% $CO_2$ IN $N_2$ | 0.57 | — | 11.19 | — | 19.6 | — | — |
| | | 10% $CO_2$ IN $CH_4$ + 1060 PPM HEXANE | — | 0.240 | 7.23 | — | — | 30.1 | — |
| | | 10% $CO_2$ IN $CH_4$ + 9800 PPM BUTANE | — | 0.239 | 6.99 | — | — | 29.2 | — |
| | Sylgard 184 | 10% $CO_2$ IN $CH_4$ | — | 0.293 | 8.62 | — | — | 29.4 | — |
| | | 10% $CO_2$ IN $CH_4$ + 1060 PPM HEXANE | — | 0.260 | 6.68 | — | — | 29.5 | — |
| | | 10% $CO_2$ IN $CH_4$ + 9800 PPM BUTENE | — | 0.235 | 6.68 | — | — | 28.4 | — |
| | | 10% $CO_2$ IN $CH_4$ + 9800 PPM BUTANE | — | 0.236 | 6.70 | — | — | 28.7 | — |
| 2 | GE 9315 | 10% $CO_2$ IN $CH_4$ | — | 0.215 | 7.11 | — | — | 33.3 | — |
| | | 10% $CO_2$ IN $N_2$ | 0.658 | — | 11.9 | — | 18.1 | — | — |
| | | 10% $CO_2$ IN $CH_4$ + 530 PPM CYCLOHEXANE | — | 0.200 | 6.65 | — | — | 33.3 | — |
| 3 | GE 9315 | 10% $CO_2$ IN $CH_4$ | — | 0.570 | 12.70 | — | — | 22.3 | — |
| | | 10% $CO_2$ IN $CH_4$ + 100 PPM TOLUENE | — | 0.329 | 7.52 | — | — | 22.8 | — |
| | | 10% $CO_2$ IN $CH_4$ + 5530 PPM CYCLOHEXANE | — | 0.325 | 7.40 | — | — | 22.8 | — |
| 4 | GE 9315 | 10% $CO_2$ IN $CH_4$ | — | 0.155 | 5.36 | — | — | 34.5 | — |
| | | 10% $CO_2$ IN $CH_4$ + 1000 PPM HEXANE | — | 0.173 | 4.39 | — | — | 25.4 | — |
| | | 10% $CO_2$ IN $CH_4$ + 9800 PPM BUTENE | — | 0.164 | 5.04 | — | — | 30.8 | — |
| 5 | GE 9315 | 10% $CO_2$ IN $CH_4$ | — | 0.541 | 11.62 | — | — | 21.5 | — |
| | | 10% $CO_2$ IN $CH_4$ + 9800 PPM BUTENE | — | 0.615 | 11.8 | — | — | 19.2 | — |
| | | 10% $CO_2$ IN $CH_4$ + 9800 PPM BUTANE | — | 0.529 | 10.58 | — | — | 20.0 | — |
| 6 | GE 9315 | 10% $CO_2$ IN $CH_4$ | — | 0.155 | 5.26 | — | — | 34.0 | — |
| | | 10% $CO_2$ IN $CH_4$ + 1000 PPM HEXANE | — | 0.127 | 4.37 | — | — | 34.4 | — |
| | | 10% $CO_2$ IN $CH_4$ + 9800 PPM BUTENE | — | 0.132 | 4.37 | — | — | 33.0 | — |
| 7 | GE 9315 | 10% $CO_2$ IN $CH_4$ | — | 1.277 | 24.00 | — | — | 18.8 | — |
| | | 10% $CO_2$ IN $N_2$ | 1.419 | — | 22.74 | — | 16.0 | — | — |
| | | 21% $O_2$ IN 79% $N_2$[1] | 2.47 | — | — | 10.8 | — | — | 4.38 |
| 8 | GE 9315 | 10% $CO_2$ IN $CH_4$ | — | 0.267 | 7.71 | — | — | 28.9 | — |
| | | 10% $CO_2$ IN $CH_4$ + 1000 PPM HEXANE | — | 0.221 | 6.44 | — | — | 29.1 | — |
| | | 10% $CO_2$ IN $CH_4$ + 5% PROPANE + 9.7% ETHANE | — | 0.170 | 5.57 | — | — | 32.7 | — |
| 9 | GE 9315 | 10% $CO_2$ IN $CH_4$ | — | 1.213 | 18.80 | — | — | 15.5 | — |
| | | 10% $CO_2$ IN $CH_4$ + 100 PPM TOLUENE | — | 0.856 | 13.69 | — | — | 16.0 | — |
| | | 10% $CO_2$ IN $CH_4$ + 5% PROPANE + 9.7% ETHANE | — | 1.644 | 24.45 | — | — | 14.9 | — |
| | | 21% $O_2$ IN 79% $N_2$[1] | 3.33 | — | — | 12.1 | — | — | 3.62 |
| 10 | GE 9315 | 10% $CO_2$ IN $CH_4$ | — | 0.442 | 10.94 | — | — | 24.8 | — |
| | | 21% $O_2$ IN 79% $N_2$[1] | 0.452 | — | — | 3.25 | — | — | 7.15 |
| 11 | GE 9315 | 10% $CO_2$ IN $CH_4$ | — | 0.825 | 19.32 | — | — | 23.42 | — |
| 12 | GE 9315 | 10% $CO_2$ IN $CH_4$ | — | 0.498 | 10.15 | — | — | 20.4 | — |
| | | 10% $CO_2$ IN $CH_4$ + 40 PPM M-XYLENE | — | 0.466 | 9.42 | — | — | 20.2 | — |
| | | 10% $CO_2$ IN $CH_4$ 530 PPM CYCLOHEXANE | — | 0.423 | 8.71 | — | — | 20.6 | — |
| 13 | GE 9315 | 10% $CO_2$ IN $CH_4$ | — | 0.439 | 12.94 | — | — | 29.5 | — |
| 14 | GE 9315 | 10% $CO_2$ IN $CH_4$ | — | 0.185 | 3.84 | — | — | 20.8 | — |
| | | 10% $CO_2$ IN $CH_4$ + 40 PPM M-XYLENE | — | 0.110 | 2.36 | — | — | 21.5 | — |
| | | 10% $CO_2$ IN $CH_4$ + 530 PPM CYCLOHEXANE | — | 0.115 | 2.41 | — | — | 20.9 | — |
| 15 | GE 9315 | 10% $CO_2$ IN $CH_4$ | — | 0.716 | 12.24 | — | — | 17.1 | — |
| | | 10% $CO_2$ IN $N_2$ | 0.586 | — | 8.83 | — | 15.1 | — | — |
| | | 49% $CO_2$ IN $CH_4$ | — | 0.910 | 13.2 | — | — | 14.5 | — |
| | | 10% $CO_2$ + 40 PPM XYLENE | — | 0.780 | 12.25 | — | — | 15.7 | — |
| | | 10% $CO_2$ + 40 PPM TOLUENE | — | 0.735 | 11.98 | — | — | 16.3 | — |
| | | 9.78% $CO_2$ + 4.82 PROPANE + 9.74% ETHANE IN $CH_4$ | — | 0.687 | 12.71 | — | — | 18.5 | — |
| | | 10% $CO_2$ + 530 PPM CYCLOHEXANE | — | 0.667 | 11.07 | — | — | 16.6 | — |
| | | 10% $CO_2$ IN $CH_4$ + 1060 PPM HEXANE | — | 0.723 | 12.08 | — | — | 16.7 | — |
| | | 10% $CO_2$ IN $CH_4$ + 9800 PPM BUTENE | — | 0.764 | 12.45 | — | — | 16.2 | — |
| | | 10% $CO_2$ IN $CH_4$ + 9800 PPM BUTANE | — | 0.800 | 12.80 | — | — | 16.0 | 0 |
| 16 | GE 9315 | 10% $CO_2$ IN $CH_4$ | — | 0.468 | 7.20 | — | — | 15.4 | — |
| | | 10% $CO_2$ IN $N_2$ | 0.391 | — | 7.03 | — | 17.9 | — | — |
| 17 | GE 9315 | 10% $CO_2$ IN $CH_4$ | — | 0.094 | 0.77 | — | — | 8.15 | — |
| 18 | GE 9315 | 10% $CO_2$ IN $CH_4$ | — | 0.126 | 2.17 | — | — | 17.2 | — |
| 19 | GE 9315 | 10% $CO_2$ IN $CH_4$ | — | 0.870 | 4.89 | — | — | 5.62 | — |
| 20[2] | GE 9315 | 10% $CO_2$ IN $CH_4$ [blend ratio DBS:NDA 90:10] | — | 0.235 | 7.17 | — | — | 30.5 | — |
| | | 10% $CO_2$ IN $CH_4$ [blend ratio DBS:NDA 75:25] | — | 0.287 | 8.47 | — | — | 29.5 | — |
| | | 10% $CO_2$ IN $CH_4$ [blend ratio DBS:NDA 50:50] | — | 0.725 | 15.41 | — | — | 21.3 | — |
| 21[3] | Sylgard 184 | 10% $CO_2$ IN $CH_4$ | — | 0.332 | 9.37 | — | — | 28.2 | — |

[1] Pressure 200 psig ambient temperature
[2] In this experiment a membrane was made by the same procedures as were employed in examples 1–14 except that two 6FDA type polyimide polymers were blended together
[3] Composite membrane having two 6FDA type polyimide polymer layers superimposed; 6FDA-DUR (adjacent to asymmetric poroussupport) and 6FDA-DBS The trials carried out in the presence of impurities (including hexane, butane, butene, cyclohexane, toluene, propane, ethane and m-xylene) confirm that the composite gas separation membranes of the invention can tolerate moderate concentrations of such impurities while still yielding good performance in terms of both permeance and selectivity.

While several embodiments of the invention have been illustrated and described above, it is not intended to be limited to the details shown, since various modifications and structural changes may be made without departing from the spirit of the present invention, which is defined by the claims below.

What is claimed as new and desired to be protected by Letters Patent is set forth in the appended claims:

1. A composite membrane comprising a porous asymmetric support having a first and a second surface area, said first surface area contacting an ultrathin polymer layer with a thickness less than 100 nm, said first surface area having an average pore diameter of about 5 nm to about 20 nm, and said second surface area having a pore diameter greater than that of the first surface area.

2. A composite membrane according to claim 1, wherein the first surface area has about $10^{10}$ to about $10^{11}$ pores/cm$^2$ and the second surface area has fewer pores/cm than the first surface area.

3. A composite membrane according to claim 1, wherein the thickness of the ultrathin polymer layer is <40 nm.

4. A composite membrane according to claim 3 wherein the thickness is 20–30 nm.

5. A composite membrane according to claim 1, wherein the polymer of the ultrathin layer is a membrane forming polymer being selected from the group consisting of cellulose triacetate (CTA), hexafluoropolysulfone (6F-PS), poly-trimethylsilylpropyne (PTMSP), polysulfone (PS), polyetherimide (PEI), polypropylene oxide (PPO) and mixtures thereof.

6. A composite membrane according to claim 1 wherein the asymmetric porous support is a polyetherimide.

7. A composite membrane according to claim 6 wherein the polyetherimide is a reaction product of at least one phenoxy-phenyldicarboxylic acid anhydride and at least one phenylenediamine.

8. A composite membrane according to claim 1 further comprising a porous structural support which is in contact with the asymmetric porous support.

9. A composite membrane according to claim 8 in which the porous structural support is a woven fabric.

10. A process for making a composite gas separation membrane comprising the following steps:

(A) Providing a base support having a first planar surface;

(B) Forming on said first planar surface an asymmetric porous support, such asymmetric porous support comprising mutually coplanar first and second regions, the thickness of said first region being substantially greater than the thickness of said second region, said first region having a microporous structure and being placed adjacent to said first planar surface, said second region having a high density of pores having an average diameter of less than about 1,000 Ångstroms, said second region comprising a first surface integrally connected to said first region and a second surface;

(C) Preparing a dissolved polymer solution comprising (1) at least one 6FDA-type polyimide polymer having been formed by the dehydration of the condensation reaction product of at least one aromatic dianhydride and at least one aromatic diamine; and (2) a solvent for the polyimide polymer which is immiscible with a selected liquid, said selected liquid being a nonsolvent for the polyimide polymer and having a higher surface tension than said dissolved polymer solution;

(D) Providing a bath containing a pool of said selected liquid, said pool having a smooth surface with high surface tension; means for depositing the dissolved polymer solution onto said smooth surface at a deposition point; and means for conveying the smooth surface away from the deposition point;

(E) Depositing said dissolved polymer solution onto said smooth surface, and removing the solvent from the dissolved polymer solution to yield an ultrathin 6-FDA type polyimide polymer selective membrane film having a leading edge, being the farthest-most edge of said polymer film floating away from said deposition point on said smooth surface, which leading edge is conveyed by the smooth surface away from the deposition point;

(F) Conveying said asymmetric porous support into a position so that said second surface is adjacent to said leading edge; and (G) Picking up said leading edge onto said second surface and conveying said second surface tangentially away from said smooth surface;

yielding a composite membrane comprising an ultrathin 6FDA-type polyimide polymer selective membrane film.

11. The process of claim 10 comprising the following additional steps:

(H) Preparing a solution comprising a sealing polymer and a sealing polymer solvent;

(I) Depositing a layer of such solution onto said ultrathin 6FDA-type polyimide polymer selective membrane film; and (J) Removing said sealing polymer solvent and curing said polymer, yielding a composite membrane comprising a nonporous protective sealing polymer layer.

12. The process of claim 11 in which the sealing polymer is a polydimethylsiloxane.

13. A composite gas separation membrane made by the process of claim 11.

14. The process of claim 10 in which said base support is a woven fabric and the first planar surface is highly uniform and smooth.

15. The process of claim 10 in which the asymmetric porous support is stripped away from the base support subsequent to step (B).

16. The process of claim 15 in which the base support is a web comprising laminated layers of metal and plastic.

17. The process of claim 15 in which the base support is a glass plate.

18. A composite gas separation membrane made by the process of claim 15.

19. The process of claim 10 in which the asymmetric porous support is formed on said first planar surface by solvent cast phase inversion.

20. A composite gas separation membrane made by the process of claim 19.

21. The process of claim 10 in which the asymmetric porous support is made of a polyetherimide polymer.

22. A composite gas separation membrane made by the process of claim 21.

23. The process of claim 10 in which each aromatic dianhydride is selected from the group consisting of: 5,5'-2,2,2-trifluoro-1-(trifluoromethyl)ethyl-idene-bis-1,3-isobenzofuranedione; 3,4,3',4'-diphenyltetracarboxylic dianhydride; 1,2,4,5-benzene-tetracarboxylic dianhydride; 3,3', 4,4'-benzophenonetetracarboxylic-dianhydride; pyromellitic dianhydride; and mixtures.

24. The process of claim 23 in which each 6FDA-type polyimide polymer is derived from the condensation of a mixture of reagents comprising 5,5'-2,2,2-trifluoro-1-(trifluoromethyl)ethylidene-bis-1,3-isobenzofuranedione with at least one aromatic diamine.

25. A composite gas separation membrane made by the process of claim 24.

26. The process of claim 10 in which each aromatic diamine is selected from the group consisting of:2,4,6-trimethyl-1,3-phenylene-diamine;4,4'-[1,4-phenylenebis(1-methyl-ethylidene)]bisaniline; 2,2-bis[4-(4-aminophenoxy)-phenyl]propane; 2,7-bis(4-aminophenoxy)-naphthalene; 4,4'-methyl-ene-bis(2,6-diisopropylaniline); 1,4-bis(4-aminophenoxy)benzene;4,4'-bis(4-aminophenoxy)-biphenyl; 1,3-bis(4-aminophenoxy)benzene; and 4,4'-(methylethylidene)bisaniline; 4-isopropyl-1,3-diaminobenzene; 4,4'-diaminodiphenylether; metaphenylenediamine; paraphenylenediamine; N,N'-metaphenylenebis(m-aminobenzanilide); and 3,3'-diaminobenz-anilide; 2-carboxy-3,5-diaminotoluene; 3,3'-diphenylhexafluoroisopropylidene diamine; 4,4'-diphenylhexafluoroisopropylidene diamine; 1,3-diaminobenzene; 2,3,5,6-tetramethyl-1,4-phenylenediamine; 1,5-diaminonaphthalene; 3,5-diaminobenzonitrile; 3,5-diaminomethylbenzoate; 3,3'-diaminophenylsulfone; 4,4'-diaminophenylsulfone; 3,7-diamino-2,8-dimethyldiphenylenesulfone; and mixtures.

27. The process of claim 26 in which each aromatic diamine is selected from the group consisting of: 3,3'-diphenylhexafluoroisopropylidene diamine;4,4'-diphenylhexafluoroisopropylidene diamine; 1,3-diaminobenzene; 2,3,5,6-tetramethyl-1,4-phenylenediamine; 1,5-diaminonaphthalene; 3,5-diaminobenzonitrile; 3,5-diaminomethylbenzoate; 3,3'diaminophenylsulfone; 44'-diaminophenylsulfone; 3,7-diamino-2,8-dimethyldiphenylenesulfone; and mixtures.

28. A composite gas separation membrane made by the process of claim 27.

29. The process of claim 10 in which the ultrathin 6FDA-type polyimide polymer selective membrane film has a thickness of less than about 1,000 Ångstroms.

30. The process of claim 29 in which the ultrathin 6FDA-type polyimide polymer selective membrane film has a thickness of less than about 400 Ångstroms.

31. The process of claim 30 in which the ultrathin 6FDA-type polyimide polymer selective membrane film has a thickness of between about 200 and about 300 Ångstroms.

32. A composite gas separation membrane made by the process of claim 29.

33. The process of claim 10 in which each 6FDA-type polyimide polymer is derived from the condensation of a mixture of reagents comprising 3,3',4,4'-benzophenone-tetracarboxylic dianhydride and 5(6)-amino-1-(4'-aminophenyl)-1,3,3-trimethylindane.

34. A composite gas separation membrane made by the process of claim 10.

35. A gas separation process comprising:
   A. providing a gas separation membrane according to claim 34, having feed and permeate sides;
   B. contacting the membrane with a mixed feed gas composition under pressure;
   C. collecting separated permeate gas from the permeate side of the membrane; and
   D. collecting retentate gas from the feed side of the membrane.

36. The process of claim 35, in which the mixed feed gas composition comprises two or more members of the group consisting of methane, nitrogen, carbon dioxide, hydrogen, oxygen, carbon monoxide, hydrogen sulfide, water, helium, propane, and ethane.

37. The process of claim 36, in which the mixed feed gas composition comprises a mixture of gases selected from the group of mixtures consisting of: air; nitrogen and oxygen; nitrogen and carbon dioxide; hydrogen and at least one hydrocarbon; carbon monoxide and hydrogen; carbon dioxide and at least one hydrocarbon; hydrogen sulfide and at least one hydrocarbon; hydrogen and nitrogen; helium and nitrogen; and helium and at least one hydrocarbon.

* * * * *